United States Patent [19]
Hirayama

[11] Patent Number: 5,835,531
[45] Date of Patent: *Nov. 10, 1998

[54] SIGNAL EQUALIZER

[75] Inventor: Koichi Hirayama, Kanagawa-ken, Japan

[73] Assignee: Kabushiki Kaisha Toshiba, Kawasaki, Japan

[*] Notice: The term of this patent shall not extend beyond the expiration date of Pat. No. 5,642,381.

[21] Appl. No.: 727,301

[22] Filed: Oct. 8, 1996

Related U.S. Application Data

[62] Division of Ser. No. 231,698, Apr. 25, 1994.

[30] Foreign Application Priority Data

Apr. 26, 1993 [JP] Japan ..................... 5-099240

[51] Int. Cl.$^6$ ....................... H04B 3/46
[52] U.S. Cl. ................. 375/229; 375/232; 364/724.2
[58] Field of Search ............ 375/229, 232, 375/233; 333/18; 364/724.2, 724.19, 825

[56] References Cited

U.S. PATENT DOCUMENTS

| | | |
|---|---|---|
| 3,864,632 | 2/1975 | Chang . |
| 4,152,649 | 5/1979 | Choquet . |
| 4,430,743 | 2/1984 | Watanabe . |
| 4,571,732 | 2/1986 | Pirani et al. . |
| 4,607,377 | 8/1986 | Atobe et al. . |
| 5,008,903 | 4/1991 | Betts et al. . |
| 5,157,691 | 10/1992 | Ohkubo et al. ............ 375/232 |
| 5,287,385 | 2/1994 | Sugawara . |
| 5,317,595 | 5/1994 | Ostman . |
| 5,347,539 | 9/1994 | Sridhar et al. ............ 375/233 |
| 5,400,189 | 3/1995 | Sato et al. . |
| 5,444,738 | 8/1995 | Ezuriko ................... 375/229 |
| 5,541,956 | 7/1996 | Ueda ...................... 375/232 |
| 5,586,100 | 12/1996 | Lee et al. ................ 375/232 |

FOREIGN PATENT DOCUMENTS

| | | |
|---|---|---|
| 0147550 | 10/1985 | European Pat. Off. . |
| 0492419 | 1/1992 | European Pat. Off. . |
| 55-34304 | 3/1980 | Japan . |
| 59-167811 | 9/1984 | Japan . |

OTHER PUBLICATIONS

Patent Abstracts of Japan; vol. 15; No. 434, 6 Nov. 1991, JP-A-03 181 218, 7 Aug. 1991.

*Primary Examiner*—Stephen Chin
*Assistant Examiner*—Joseph Roundtree
*Attorney, Agent, or Firm*—Cushman Darby & Cushman IP Group of Pillsbury Madison & Sutro LLP

[57] ABSTRACT

A signal equalizer for equalizing a waveform of a digital data sequence includes a discriminator for discriminating average measurement levels at plural frequencies of the digital data sequence, an error operating unit for finding the ratio or difference between an equalizing target average level which correspond to the plural frequencies that has been found in advance and an average level obtained by the discriminator and a controller for controlling an equalizing characteristic of the equalizer based on the error information obtained by the error operating unit.

23 Claims, 7 Drawing Sheets

FIG. 2B
EQUALIZER 22

FIG. 3A

EYE PATTERN OF PRE-EQUALIZATION DATA SEQUENCE

FIG. 5A

EYE PATTERN AFTER EQUALIZATION OF DATA SEQUENCE

SIGNAL EQUALIZER

This is a division of application Ser. No. 08/231,698, filed Apr. 25, 1994.

The present invention relates to a signal equalizer which performs a waveform equalization for a digital data sequence reproduced from a digital data record medium, such as, an optical disc and a magnetic disc.

DESCRIPTION OF THE RELATED ART

Figure 1:
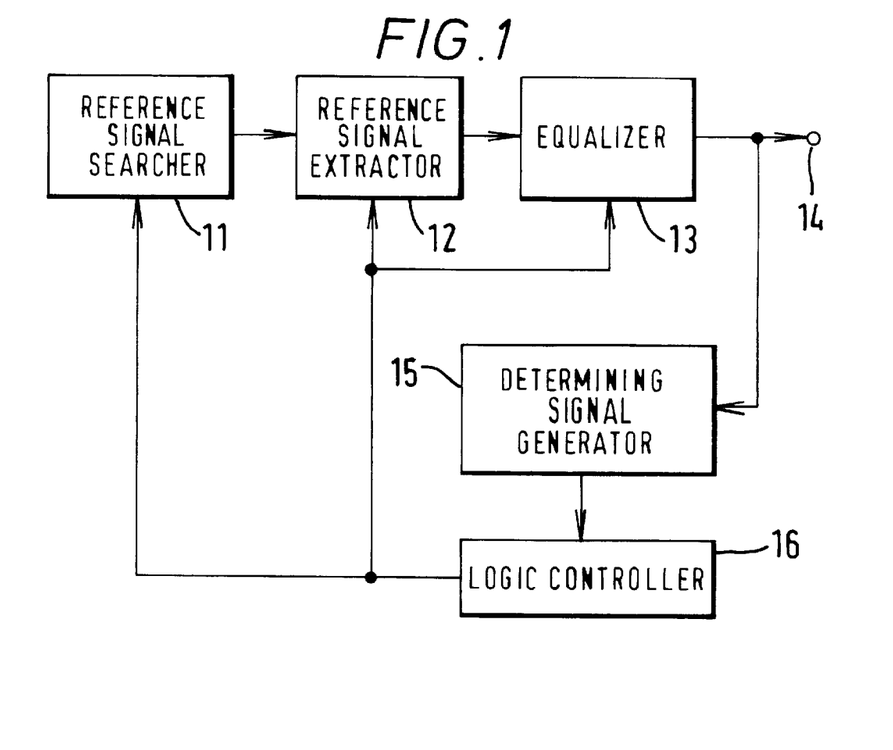
FIG. 1 is a diagram showing a conventional waveform equalizing apparatus.

A conventional apparatus for automatically equalizing waveforms of signals reproduced from a record medium, for example, optical discs has been constructed as shown in FIG. 1. Generally, a specified data pattern sequence called a reference signal or a training signal, is recorded on a predetermined position of such a recordation medium to enable automatic waveform equalization.

Referring now to FIG. 1, a reference signal is searched by a reference signal searcher 11. The reference signal searched by the reference signal searcher 11 is extracted by a reference signal extractor 12, and then applied to an equalizer 13. The equalizer 13 performs a waveform equalization for the extracted reference signal and provides the equalized signal at output terminal 14. The equalized signal output from the equalizer 13 is also input to a determining signal generator 15. The determining signal generator 15 generates error information by comparing the waveform or frequency spectrum of the equalized signal with a target characteristic signal operating as the reference signal or the training signal. This error information is input to a logic controller 16. The logic controller 16 controls the equalizing characteristic of the equalizer 13 based on the error information to keep the waveform or frequency spectrum characteristic of the equalizer 13 close to the target characteristic signal. The logic controller 16 also controls reproducing apparatus for the search of the reference signal.

As described above, the conventional waveform equalization system corrects the waveform equalization characteristic based on error information by reproducing a predetermined reference signal and by determining whether there is an aberration, based on a comparison of the reproduced reference signal with the target characteristic.

The conventional waveform equalization system is inefficient in the time aspect, because the conventional waveform equalization system needs extra time for reproducing the record signal and then searching reference signals from the reproduced signals. Further, once a waveform equalization characteristic is determined, the characteristic is maintained until all desired information from a disc is reproduced. Although it would be better to modify the waveform equalization characteristic based on various recording positions on the disc, such modification is not possible in the conventional system. Rather, to respond to this demand, suitable reference signals must be recorded on different positions (e.g., an outer recording area, an intermediate recording area, an inner recording area of a disc), and the waveform equalization characteristic must be established at each recording area of the disc. The conventional system is unable to operate effectively based on reference signals stored at various positions due to disturbances in the finite length integrated reference signals resulting from defects in the record medium. Further, since the reference signals must be stored at various different positions on the conventional recording medium to achieve the proposed modification, space on the conventional system recording medium must be spared for recording the reference signal. Consequently, the amount of information that may be recorded on a conventional recording medium implementing the proposed modification would be limited.

SUMMARY OF THE INVENTION

It is therefore an object of the present invention to provide a signal equalizer which is able to establish waveform equalization characteristic which is effective in the time aspect.

Another object of the present invention is to provide a signal equalizer which is able to determine a waveform equalization characteristic during a normal signal reproducing operation.

Still another object of the present invention is to provide a signal equalizer which is able to endure disturbances.

A further object of the present invention is to provide a signal equalizer which is able to carry out a better waveform equalization over a whole record area to make good use of the record medium.

In order to achieve the above objectives, a signal equalizer according to one aspect of the present invention is provided a discriminator for discriminating average measurement levels at plural frequencies of the digital data sequence, an error operating unit for finding the ratio or difference between an equalizing target average level which correspond to the plural frequencies that has been found in advance and an average level obtained by the discriminator and a controller for controlling an equalizing characteristic of the equalizer based on the error information obtained by the error operating unit.

The signal equalizer in the aspect of the above description employs an average recording frequency spectrum unconditionally determinable by a data recording modulation system as a reference spectrum. Thus, it does not need to record or use a reference signal. And so, even in a normal signal reproducing operation, the average spectrum of output is automatically equalized to come close to the target spectrum (or a supervisor spectrum) which has been established based on the reference spectrum and the reproduction limits characteristic.

For a better understandings of the present invention and many of the intended advantages thereof, reference will now be made by way of example to the accompanying drawings, wherein.

DETAILED DESCRIPTION OF THE PREFERRED EMBODIMENT

The present invention will be described in detail with reference to the FIGS. 2A through 6B.

Figure 2A:
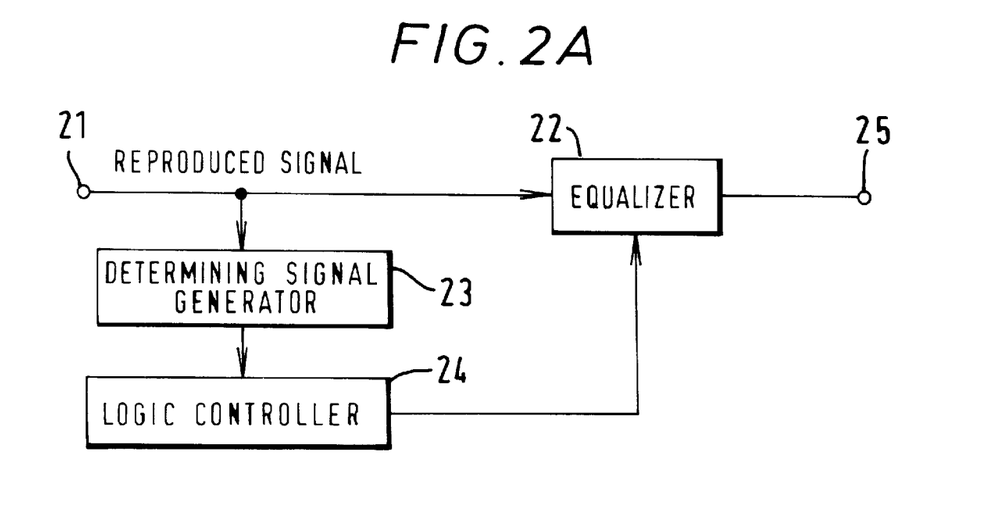
FIG. 2A is a diagram showing one embodiment of a signal equalizer according to the present invention.

Referring now to FIGS. 2A through 2D, a first embodiment of the signal equalizer according to the present invention will be described in detail. In FIG. 2A, an input terminal 21 receives a reproduced signal (or a digital data sequence) reproduced from record medium (not shown) such as an optical disc. This reproduced signal is applied to an equalizer 22 and a determining signal generator 23. The equalizer 22 equalizes the waveform of the input reproduced signal, and sends the equalized signal to an output terminal 25.

Figure 2B:
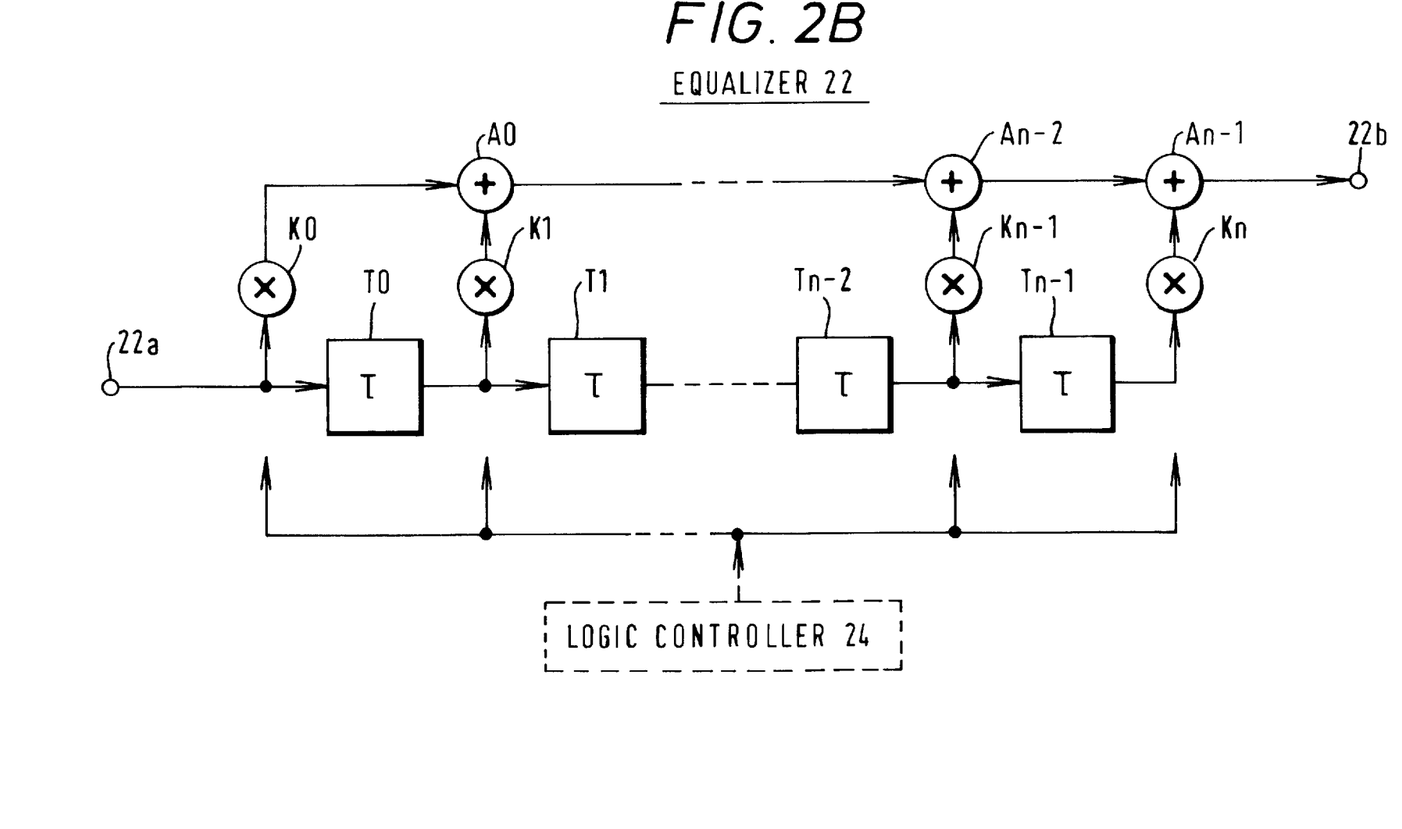
FIGS. 2B to 2D are diagrams showing detailed constructions of the units 22, 23 and 24 of FIG. 2A.

The equalizer 22 is constructed as shown in FIG. 2B. In FIG. 2B, the signal at input terminal 22a is delayed by a period of one sample (i.e., a time period of $\tau$) in passing through n number of delay units T0 through Tn−1 connected in series, wherein n is an even number. Further n+1 number of multiplier coefficient registers K0 through Kn are connected to the input terminals and output terminals of the delay units T0 through Tn−1, respectively. The outputs of the coefficient registers K0 through Kn are sequentially added with the input signal 22a by adders A0 through An−1 and the output of the adder An−1 is lead to the output terminal 22b. Here, if the coefficients of coefficient registers K0 through kn are controlled by control signals for equalization, the waveform equalization characteristic will be able to be adjusted. The control signals for equalization are provided from a logic controller 24 which will be described later.

Figure 2C:
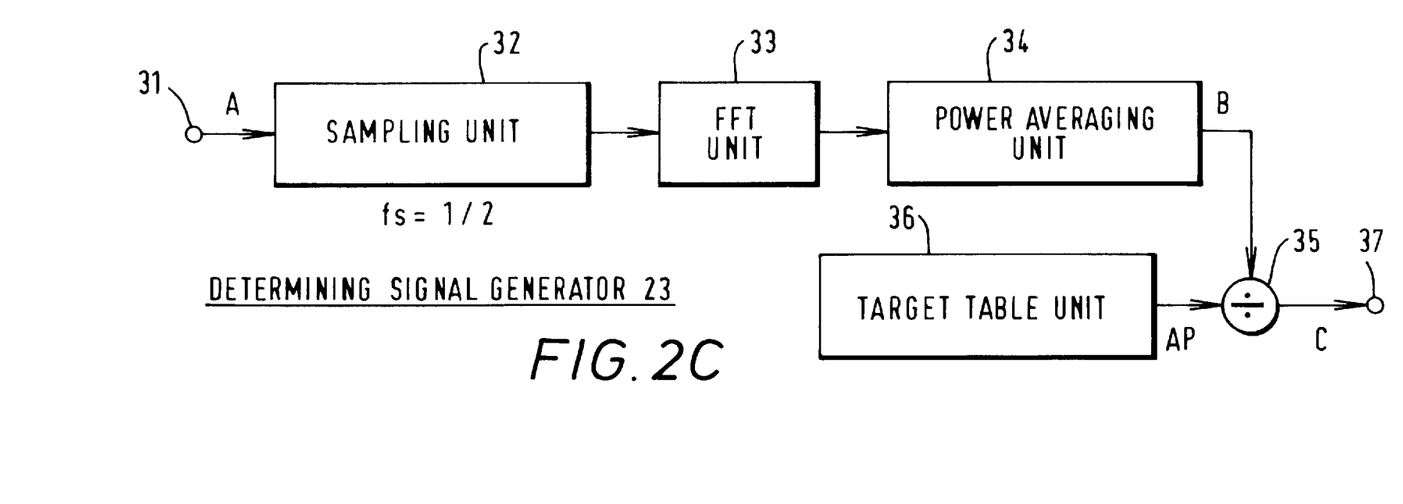

The determining signal generator 23 is constructed as shown in FIG. 2C. In FIG. 2C, the reproduced signal on the input terminal 21 of FIG. 2A is supplied to a sampling unit 32 via an input terminal 31 of the generator 23. The sampling unit 32 samples the input reproduced signal every time period ($\tau$) of delay line tap coefficients, and supplies the sampled signal to a fast Fourier transform (FFT) unit 33. Power spectrums of the sampled signal are obtained as a result of the FFT operations of the unit 33. These power spectrums are input to a power averaging unit 34. The power information corresponding to each frequency is averaged at preset execution times to generate an average power spectrum B. Further, a determining signal generator 23 has a target table unit 36. Peculiar data of the power spectrum for the recording data sequence power spectrum have been previously generated and recorded as a target spectrum AP in reference to a reproduction limit characteristic.

Figure 2D:
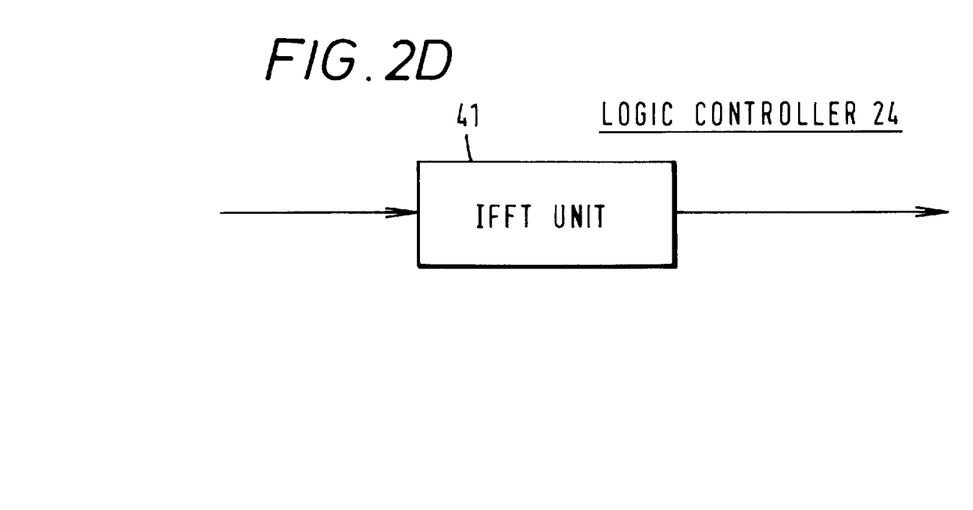

The average power spectrum B and the target spectrum AP corresponding to the average power spectrum B are input to a divider 35. Data C which represents a ratio between the average power spectrum B on every frequency and the target power spectrum AP is generated from the divider 35 and sent to an output terminal 37. The logic controller 24 receives the output data C through the output terminal 37. The logic controller 24 includes an inverse fast Fourier transform (IFFT) unit 41, as shown in FIG. 2D, which performs the IFFT operation on the data C. The result of the IFFT operation is then output as prescribed tap coefficients for the equalizer 22.

According to the above construction the tap coefficients for the equalizer 22 are controlled so that the average power spectrum B and the target power spectrum AP have a predetermined relation therebetween.

Figure 3A:
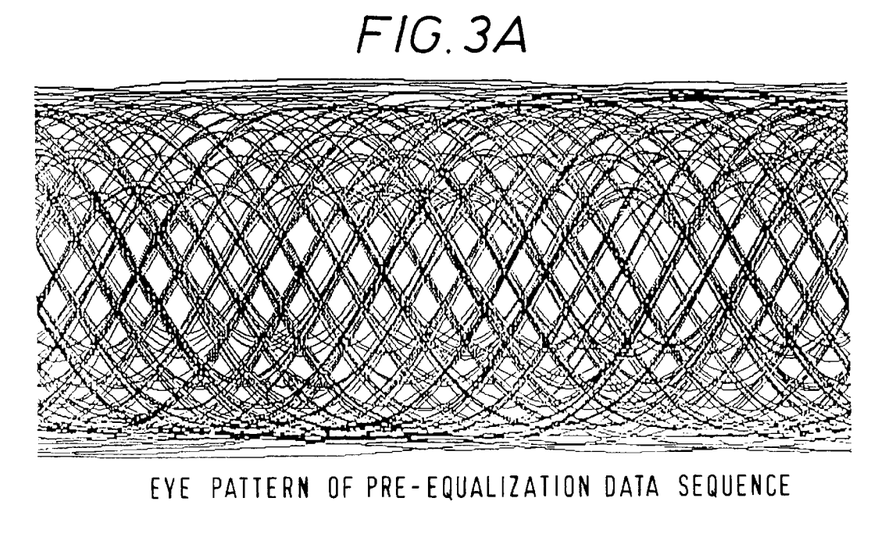
FIG. 3A is an eye pattern diagram of signal prior to an equalization in the equalizer 22 of FIG. 2A, for explaining the operation of the equalizer according to the present invention.
Figure 3B:
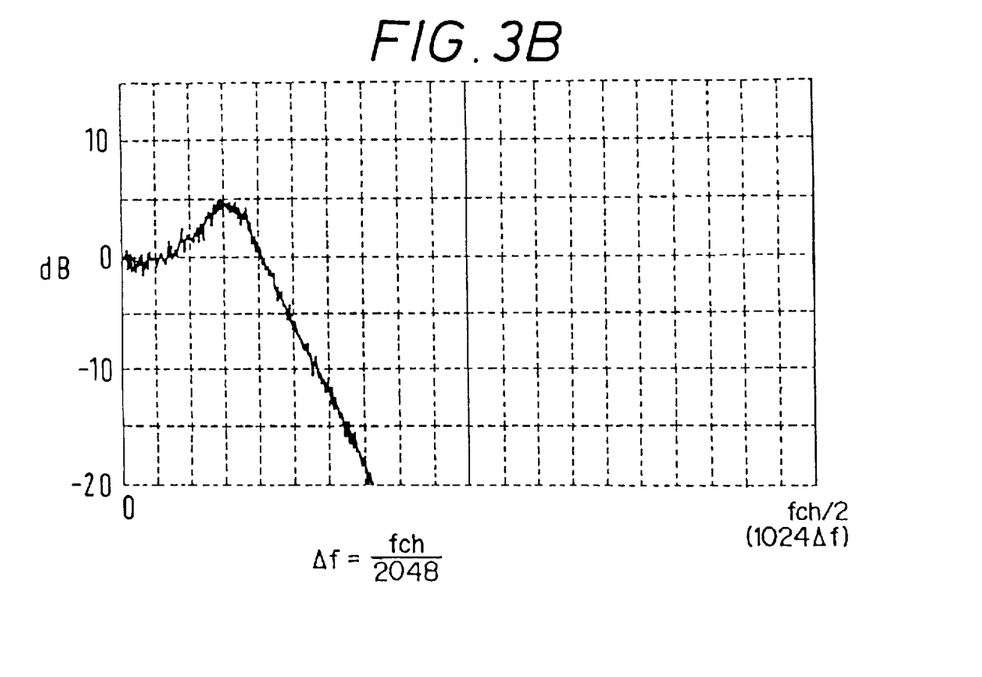
FIG. 3B is a graph showing a power spectrum characteristic of signal prior to the equalization, for explaining the operation of the equalizer according to the present invention.

FIG. 3A shows an eye pattern of pre-equalization data sequence, while FIG. 3B shows a characteristic diagram of the average power spectrum B obtained by sampling the data sequence at a sampling frequency fch, and then carrying out the fast Fourier transform operation at 2048 points of frequency spectrum.

Figure 4:
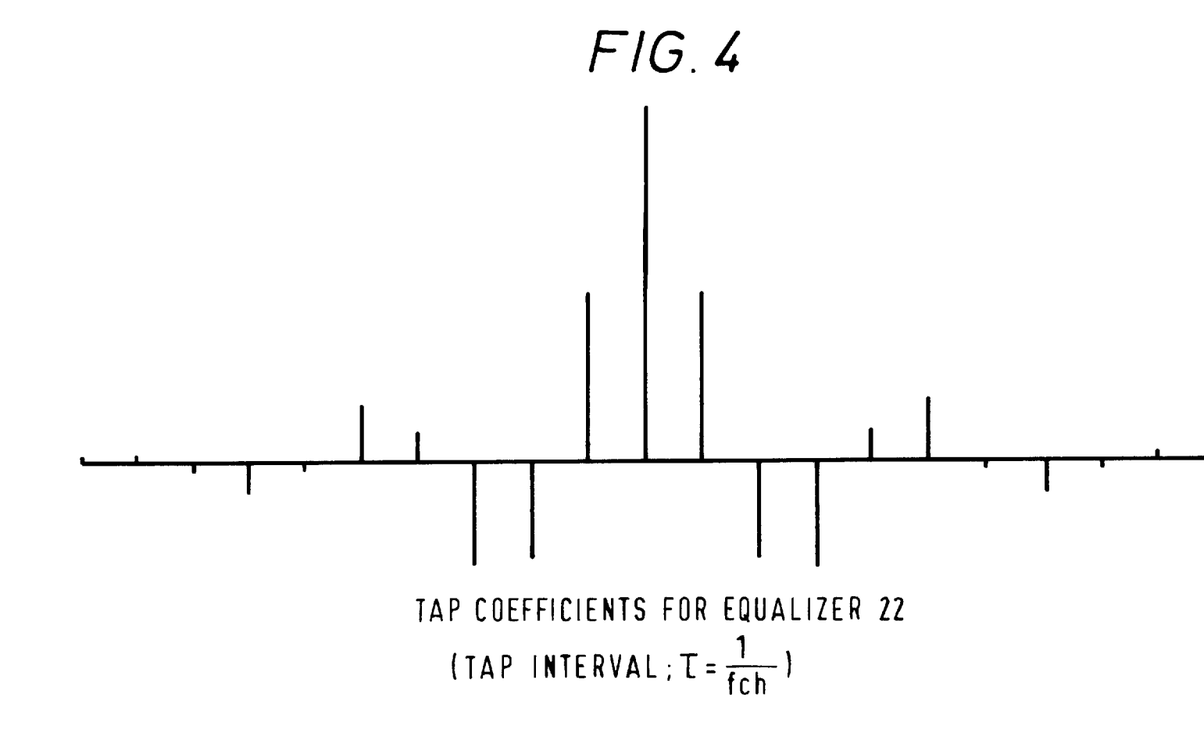
FIG. 4 is a diagram showing exemplary tap coefficients, for explaining the operation of the equalizer according to the present invention.

The target power spectrum AP corresponding to the average power spectrum B is stored in the target table unit 36. FIG. 4 shows the tap coefficients obtained for the equalizer 22 by calculating the data C which represents the ratio of the target power spectrum AP and corresponding average power spectrum B, and by performing the inverse fast Fourier transform operation for the data C.

Figure 5A:
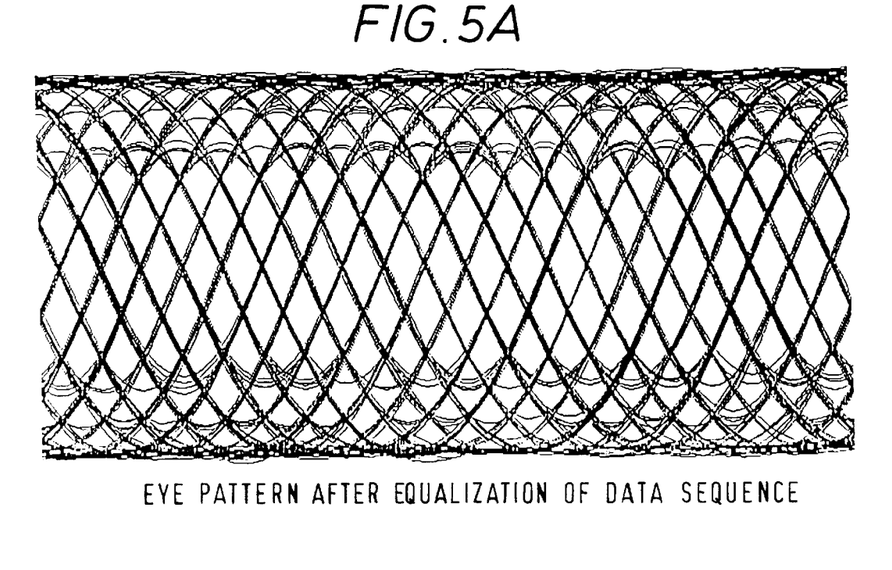
FIG. 5A is an eye pattern diagram of signal after the equalization in the equalizer 22 in FIG. 2A, for explaining the operation of the equalizer according to the present invention.
Figure 5B:
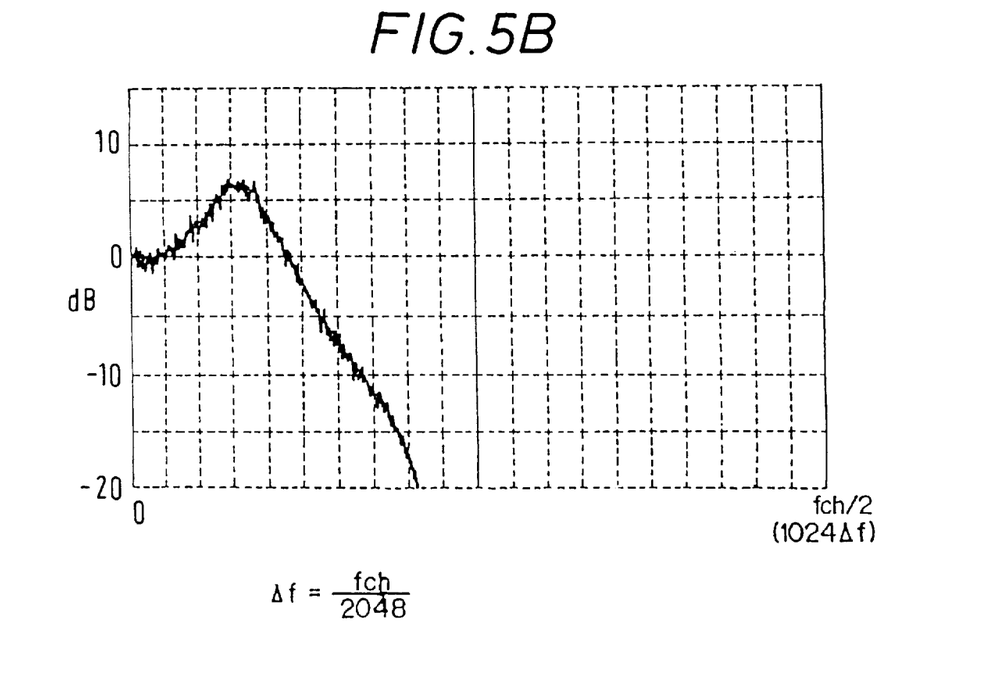
FIG. 5B is a graph showing a power spectrum characteristic after the equalization, for explaining the operation of the equalizer according to the present invention.

FIG. 5A shows the eye pattern of the data sequence after a waveform equalization by 15 samples (n=14) of tap coefficients. FIG. 5B shows a characteristic diagram of an average power spectrum obtained by sampling the data sequence by sampling frequency fch, and then carrying out the fast Fourier transform operation at 2048 points of frequency spectrum. This power spectrum was confirmed to be almost equal to the target power spectrum (i.e., the supervisor power spectrum) AP.

The present invention is not limited to the embodiment as mentioned above. For instance, the number of points for the FFT operation or the IFFT operation can be reduced lower than the 2048 points, without causing any problems.

Figure 6A:
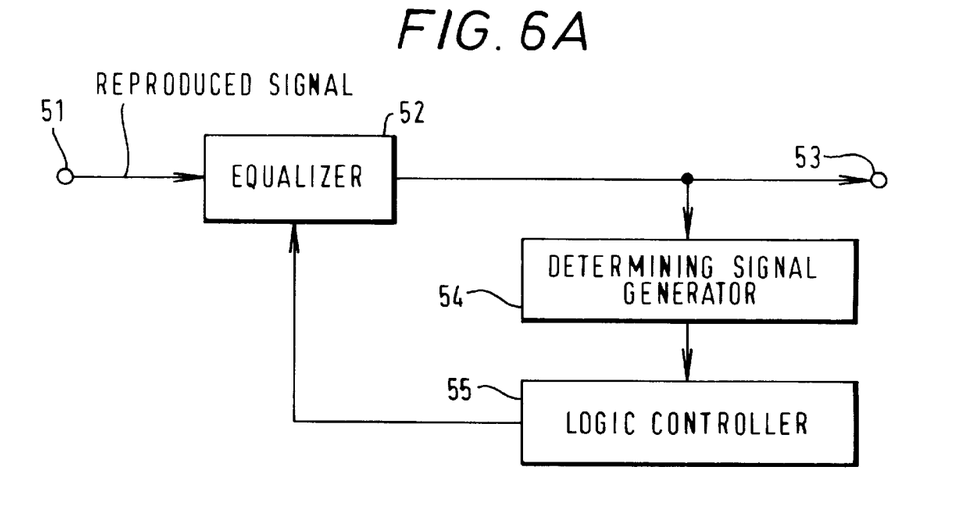
FIG. 6A is a block diagram showing another embodiment of a signal equalizer according to the present invention.
Figure 6B:
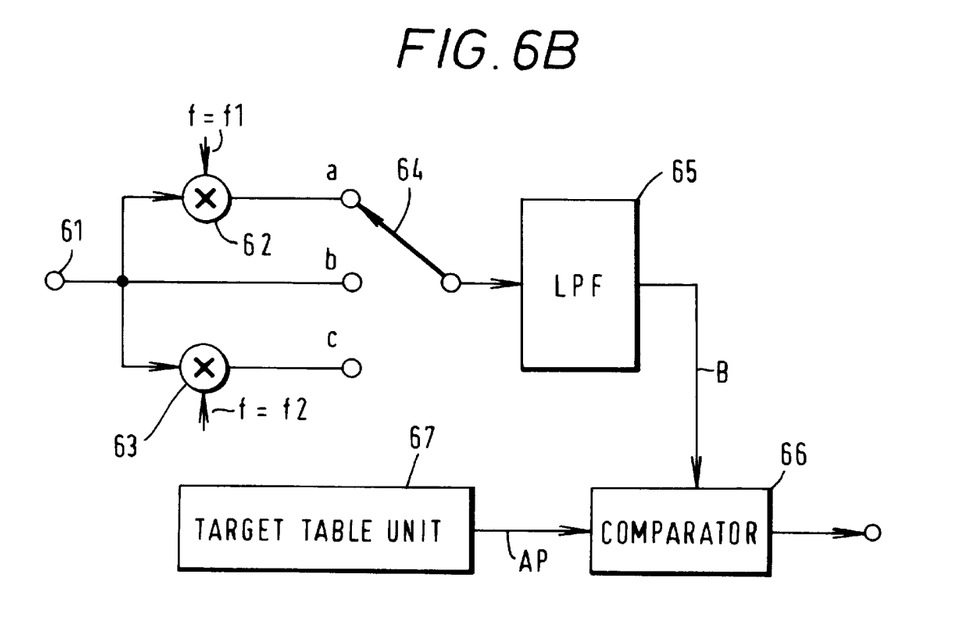
FIG. 6B shows a detailed construction of the determining signal generator 54 of FIG. 6A.

FIG. 6A shows a block diagram of a signal equalizer according to a second embodiment of the present invention. FIG. 6B shows a detailed construction of the determining signal generator 54 of FIG. 6A.

In FIG. 6A an input terminal 51 receives a reproduced signal. This reproduced signal is applied to an equalizer 52 where the input reproduced signal waveform is equalized waveform. The equalized signal is not only sent to an output terminal 53, it is also applied to a determining signal generator 54. The equalizer 52, constructed in similar to the equalizer 22 of the first embodiment, is supplied with a control signal for equalization from a logic controller 55.

The determining signal generator 54 is constructed as shown in FIG. 6B. The determining signal generator 54 having the construction, as shown in FIG. 6B, generates (N−1) waveform of signals which are comprised of the input signal, and multiplied signals of the input signal with the sinewave signals or square wave signals of N waveform of frequencies (where N≧2). The determining signal generator 54 then supplies the (N−1) waveform of signals to a common narrow bandwidth low pass filter (LPF) 65 by changing the signals sequentially. Then the output of the LPF 65 is supplied to, and detected by, a comparator 66 for obtaining the spectrum data B at the DC component and around the N samples of frequencies.

When showing an example of N=2, the output of the equalizer 52 is introduced to an input terminal 61 of the generator 54 as illustrated in detail in FIG. 6B. The input equalized signal on the input terminal 61 is sent to terminals a, c of a switch 64 after being multiplied with sinewave signals or square wave signals of different frequencies, respectively, at multipliers 62, 63. While another terminal b of the switch 64 is directly applied with the input equalized signal. In the multiplier 62, input equalized signal is multiplied with a frequency f1 meanwhile in multiplier 63, a frequency f2 is multiplied with the input equalized signal. A certain signal selected by the switch 64 is smoothed in the LPF 65. The smoothed signal is then applied to a comparator 66 as a measured power spectrum B.

This system is further provided with a target table unit 67. This target table unit 67 stores data of the target spectrum AP which corresponds to each signal on the input terminals a, b, c of the switch 64, and supplies the spectrum data to the comparator 66. The target spectrum AP is defined by adding a reproduction limits characteristic on a power spectrum of a recorded data sequence intrinsic to the recording modulation system the same as the above embodiment.

The comparator 66 outputs an error signal C between the target spectrum AP and a measured spectrum B which corresponds to the target spectrum AP, and supplies the error signal C to the logic controller 55. Then the logic controller 55 controls the tap coefficient of the equalizer 52 to make it converged to zero based on the error signal C. According to this operation the error signal C can be gradually converged to zero. As a repetition algorithm in this step, a least square algorithm which is conventionally used for an automatic equalization will be employed.

The second embodiment as mentioned above can result the same effect as the first embodiment. Though the first and second embodiments can be explained as an apparatus in which the target table units 36, 67 are originally included, the contents of the table may be changeable from the outside, if a different target characteristic depended on recorded contents of the reproduced signal, as circumstances require.

According to this modification, if a new recording system of an optical disc or of a magnetic disc would be developed, it can be applied to the new recording system. Also, it can correspond to reproduced signals from a disc in which the characteristics of the recorded data itself is deteriorated.

Further, when the table memory has a sufficient capacity it may change read-out modes by making various characteristics simplified.

According to the present invention as described above, it does not need to record a reference signal on the recording medium. Also, it does not need to search for recorded reference signals.

Furthermore, it does not need a time to reproduce recorded signals for extracting the reference signal therefrom. Also, the present invention will be effective in the time aspect because a waveform equalization system is in motion automatically when reproduced. And a waveform equalization characteristic can obtain the most suitable waveform in compliance with a recording position on a disc because of being controlled automatically to the best characteristic anytime until a reproducing operation for one disc is terminated. And it can use a record medium area effectively and can contribute to increase a recorded density of information quantity as a recording of reference signal is not required. And an controlled operation of waveform equalization can be obtained everytime. So that even if there are disturbances due to crosstalks or defects of the record medium, usual operation can be taken soon.

As described above, the present invention can provide an extremely preferable signal equalizer.

That is, the present invention can establish a waveform equalization characteristic which is effective in the time aspect, can arrange a waveform equalization characteristic in performing the normal signal reproducing. It can also endure the disturbances, carry out the best waveform equalization all over, and also can make good use of recorded medium.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

I claim:

1. A signal equalizer for equalizing a waveform of a digital data sequence, comprising:

discriminating means for discriminating power measurements for each of plural frequencies of the digital data sequence;

averaging means for generating average power measurements at plural frequencies of the digital data sequence by averaging more than one of the power measurements made by the discriminating means for each of the plural frequencies of the digital data sequence;

error operating means for generating error information based on predetermined equalizing target average powers which respectively correspond to each of the plural frequencies and the average power measurements generated by the averaging means; and controller means for controlling an equalizing characteristic of the signal equalizer based on the error information obtained by the error operating means.

2. A signal equalizer as claimed in claim 1, wherein data representing the equalizing target average power spectrum is stored in a table in which data has been preset.

3. A signal equalizer as claimed in claim 2, wherein the preset data stored in the table is changeable with externally input and different data.

4. A signal equalizer for equalizing a waveform of a digital data sequence, comprising:

input means for receiving the digital data sequence;

discriminating means for discriminating power measurements for each of plural frequencies of the digital data sequence from the input means;

averaging means for generating average power measurements at plural frequencies of the digital data sequence by averaging more than one of the power measurements made by the discriminating means for each of the plural frequencies of the digital data sequence;

error operating means for generating error information based on predetermined equalizing target average powers which respectively correspond to each of the plural frequencies and the average power measurements generated by the averaging means; and controller means for controlling an equalizing characteristic of the signal equalizer based on the error information obtained by the error operating means.

5. A signal equalizer as claimed in claim 4, wherein data representing the equalizing target average power spectrum is stored in a table in which data has been preset.

6. A signal equalizer as claimed in claim 5, wherein the preset data stored in the table may be changed based on externally input different data.

7. A signal equalizer for equalizing a waveform of a digital data sequence, comprising:

output means for outputting the digital data sequence;

discriminating means for discriminating power measurements for each of plural frequencies of the digital data sequence from the output means;

averaging means for generating average power measurements at plural frequencies of the digital data sequence by averaging more than one of the power measurements made by the discriminating means at each of the plural frequencies of the digital data sequence;

error operating means for generating error information based on predetermined equalizing target average powers which respectively correspond to each of the plural frequencies and the average power measurements generated by the averaging means; and controller means for controlling an equalizing characteristic of the signal equalizer based on the error information obtained by the error operating means.

8. A signal equalizer as claimed in claim 7, wherein the digital data sequence is a reproduced signal based solely on non-training signals.

9. A signal equalizer as claimed in claim 7, wherein the predetermined equalizing targe average powers are stored in a table in which data has been preset.

10. A signal equalizer as claimed in claim 1, wherein the error information is one of a ratio and a difference between the predetermined equalizing target average powers respectively corresponding to each of the frequencies and the average power measurements obtained by the discriminating means.

11. A signal equalizer as claimed in claim 4, wherein the error information is one of a ratio and a difference between the predetermined equalizing target average powers respectively corresponding to each of the frequencies and the average power measurements obtained by the discriminating means.

12. A signal equalizer for equalizing a waveform of a digital data sequence, comprising:

a discriminator discriminating power measurements for each of plural frequencies of the digital data sequence;

an averaging device generating average power measurements at plural frequencies of the digital data sequence by averaging more than one of the power measurements made by the discriminator for each of the plural frequencies of the digital data sequence;

an error computing device generating error information based on predetermined equalizing target average powers which respectively correspond to each of the plural frequencies and the average power measurements generated by the averaging device; and a controller controlling an equalizing characteristic of the signal equalizer based on the error information obtained by the error computing device.

13. A signal equalizer for equalizing a waveform of a digital data sequence, comprising:

an input device receiving the digital data sequence;

a discriminator discriminating power measurements for plural frequencies of the digital data sequence from the input device;

an averaging device generating average power measurements at plural frequencies of the digital data sequence by averaging more than one of the power measurements made by the discriminator for each of the plural frequencies of the digital data sequence;

an error computing device generating error information based on predetermined equalizing target average powers which respectively correspond to each of the plural frequencies and the average power measurements generated by the averaging device; and a controller controlling an equalizing characteristic of the signal equalizer based on the error information obtained by the error computing device.

14. A signal equalizer for equalizing a waveform of a digital data sequence, comprising:

an output device receiving the digital data sequence;

a discriminator discriminating power measurements for plural frequencies of the digital data sequence from the output device;

an averaging device generating average power measurements at plural frequencies of the digital data sequence by averaging more than one of the power measurements made by the discriminator for each of the plural frequencies of the digital data sequence;

an error computing device generating error information based on predetermined equalizing target average powers which respectively correspond to each of the plural frequencies and the average power measurements generated by the averaging device; and a controller controlling an equalizing characteristic of the signal equalizer based on the error information obtained by the error computing device.

15. A signal equalizer as claimed in claim 12, wherein data representing equalizing target average power spectrum is stored in a table in which data has been preset.

16. A signal equalizer as claimed in claim 15, wherein the preset data stored in the table may be changed based on externally input different data.

17. A signal equalizer as claimed in claim 12, wherein error information is one of a ratio and a difference between the predetermined equalizing, target average powers respectively corresponding to each of the frequencies and the average power measurements obtained by the discriminator.

18. A signal equalizer as claimed in claim 13, wherein the equalizing target average power spectrum is stored in a table in which data has been preset.

19. A signal equalizer as claimed in claim 18, wherein the preset data stored in the table may be changed based on externally input different data.

20. A signal equalizer as claimed in claim 13, wherein the error information is one of a ratio and a difference between the predetermined equalizing target average powers respectively corresponding to each of the frequencies and the average power measurements obtained by the discriminator.

21. A signal equalizer as claimed in claim 14, wherein the digital data sequence is a reproduced signal based solely on non-training signals.

22. A signal equalizer as claimed in claim 14, wherein the preset data stored in the table may be changed based on externally input different data.

23. A signal equalizer as claimed in claim 7, wherein the error information is one of a ratio and a difference between the predetermined equalizing target average powers respectively corresponding to each of the frequencies and the average power measurements obtained by the discriminating means.

* * * * *